US010448329B2

(12) United States Patent
Hong et al.

(10) Patent No.: US 10,448,329 B2
(45) Date of Patent: Oct. 15, 2019

(54) APPARATUS AND METHOD FOR CONTROLLING TCP CONNECTIONS IN A WIRELESS COMMUNICATION SYSTEM

(71) Applicant: Samsung Electronics Co., Ltd., Suwon-si, Gyeonggi-do (KR)

(72) Inventors: Young-Ki Hong, Seoul (KR); Karthikeyan Arunachalam, Bangalore (IN); Rana Prasad Sahu, Suwon-si (KR); Muthu Veerappan Alagappan, Suwon-si (KR); Jin-Ho Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/813,201

(22) Filed: Nov. 15, 2017

(65) Prior Publication Data

US 2018/0098282 A1    Apr. 5, 2018

Related U.S. Application Data

(63) Continuation of application No. 14/843,784, filed on Sep. 2, 2015, now Pat. No. 9,826,481.

(30) Foreign Application Priority Data

Sep. 2, 2014    (IN) .............................. 903/KOL/2014
Sep. 2, 2015    (KR) ........................ 10-2015-0124106

(51) Int. Cl.
*H04W 52/02*    (2009.01)
*H04W 76/38*    (2018.01)
*H04W 76/34*    (2018.01)

(52) U.S. Cl.
CPC ....... *H04W 52/0225* (2013.01); *H04W 76/38* (2018.02); *H04W 76/34* (2018.02);
(Continued)

(58) Field of Classification Search
CPC ...... H04L 69/16; H04W 76/19; H04W 76/068
See application file for complete search history.

(56) References Cited

U.S. PATENT DOCUMENTS

2005/0063304 A1    3/2005    Slillasto et al.
2006/0088003 A1    4/2006    Harris
(Continued)

FOREIGN PATENT DOCUMENTS

WO    WO 2014/039853    3/2014

OTHER PUBLICATIONS

Extended European Search Report Appln No. 15838710.0 dated Mar. 22, 2018 (13 pgs).
(Continued)

*Primary Examiner* — Shukri Taha
(74) *Attorney, Agent, or Firm* — The Farrell Law Firm, P.C.

(57) ABSTRACT

The present disclosure relates to an apparatus and a method for controlling Transmission Control Protocol (TCP) connection close to improve a battery life time of a client such as a smart phone in a wireless communication system are provided. A method of operating a client in a wireless communication system includes determining a data transfer inactivity time of at least one of TCP connections, and closing the at least one of TCP connections at the data transfer inactivity time.

16 Claims, 22 Drawing Sheets

(52) U.S. Cl.
    CPC .............. *Y02D 30/30* (2018.01); *Y02D 70/00* (2018.01); *Y02D 70/1262* (2018.01)

(56) References Cited

U.S. PATENT DOCUMENTS

| | | | |
|---|---|---|---|
| 2006/0195840 A1 | 8/2006 | Sundarrajan et al. | |
| 2007/0130324 A1* | 6/2007 | Wang | H04L 43/0817 709/224 |
| 2011/0213893 A1 | 9/2011 | Morris | |
| 2013/0024523 A1 | 1/2013 | Albasher et al. | |
| 2013/0064179 A1 | 3/2013 | Attar et al. | |
| 2013/0201889 A1 | 8/2013 | Hong et al. | |
| 2013/0282911 A1* | 10/2013 | Meylan | H04W 76/32 709/227 |
| 2014/0064134 A1 | 3/2014 | Huang et al. | |
| 2014/0189093 A1* | 7/2014 | du Toit | H04L 47/10 709/224 |
| 2014/0241251 A1 | 8/2014 | Karlsen et al. | |
| 2016/0094466 A1* | 3/2016 | Arvidsson | H04W 80/06 370/235 |

OTHER PUBLICATIONS

Feng Qian et al: "Silent TCP connection closure for cellular networks". Proceedings of the Ninth ACM Conference on Emerging Networking Experiments and Technologies. Conext 'B. [Online] Dec. 12, 2013 (Dec. 12, 2013). pp. 211-216. XP055458960. New York. New York. USA DOI: 10.1145/2535372.2535402 ISBN: 978-1-4503-2101-3 Retrieved from the Internet: URL:http://conferences.sigcomm.org/co-next/2013/program/p211.pdf>abstract; sections 1-5.

Int'l Search Report dated Dec. 17, 2015 corresponding Appln No. PCT/KR2015/009244.

Written Opinion of the Int'l Searching Authority corresponding to Appln No. PCT/KR2015/009244.

Akihiro Sato et al., "Connection Termination Method by Clients in Web Service", The Institute of Electrical Engineers of Japan, vol. 129, No. 11, Nov. 1, 2009, 12 pages.

Japanese Office Action dated Jun. 24, 2019 issued in counterpart application No. 2017-512283, 6 pages.

* cited by examiner

APPARATUS AND METHOD FOR CONTROLLING TCP CONNECTIONS IN A WIRELESS COMMUNICATION SYSTEM

RELATED APPLICATIONS

The present application is a continuation of U.S. application Ser. No. 14/843,784 titled "Apparatus and Method for Controlling TCP Connections in a Wireless Communication System" and filed on Sep. 2, 2015, which in turn claims priority to and claims the benefit of Indian Patent Application No. 903/KOL/2014 filed in the India Intellectual Property Office on Sep. 2, 2014 and a Korean patent application No. 10-2015-0124106 filed in the Korean Intellectual Property Office on Sep. 2, 2015. The contents of each of the above applications are hereby incorporated herein by reference in their entirety.

BACKGROUND

The present disclosure relates generally to computing devices. More particularly, the present disclosure relates to an apparatus and a method for controlling Transmission Control Protocol (TCP) connections in a wireless communication system.

In recent wireless communication environments, electronic devices (or client devices), such as smart phones, run several network applications (e.g., Facebook, Twitter, Email, Flipboard, AccuWeather) by interacting with independent and remote servers. Most of these applications interact with the servers by establishing transmission protocol connections which are short-lived in nature, for example, Transmission Control Protocol (TCP) connections.

When a client device does not adequately close the TCP connections, the client device can cause considerable power consumption. In this regard, there are typical methods for initiating TCP connection closure at the client or the server.

A conventional client-initiated close method for use with TCP connections immediately closes a corresponding inactive TCP connection when data exchange is finished. However, the conventional method also closes the inactive TCP connection to be reused. For the TCP connection reuse, transport layer setup is required, which takes time.

By contrast, in a server-initiated close method for use with TCP connections, a server initiates a TCP connection close by sending Finish (FIN) packets to clients after a server timeout, which may last from several seconds to several minutes (e.g., 30 s, 60 s, 120 s, and the like).

Such the TCP connections with short life generally have a characteristic of data transfer with a limited frequency between a client and server end points. Once data is exchanged, the remaining time of an established TCP connections is idle. An established yet idle TCP connection is vulnerable to the server timeout causing a close message (e.g., FIN packets) with intervals ranging from seconds to minutes.

Thus, in a wireless communication network (e.g., $3^{rd}$ Generation (3G)/LTE), server-initiated close messages result in energy overhead caused by network radio state transition from an idle state to an active state in addition to tail energy consumed by the wireless communication network. In some cases, delayed close messages keep a radio interface as the active state on for a longer time by resetting a radio-layer timer, and even trigger an additional radio state transition by turning on the radio interface thereby causing energy overhead.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies of the prior art, it is a primary aspect of the present disclosure to provide an apparatus and a method for controlling Transmission Control Protocol (TCP) connections in a wireless communication system.

Another aspect of the present disclosure is to provide an apparatus and a method for controlling TCP connections to improve a battery life time of an electronic device such as smart phone in a wireless communication system.

Yet aspect of the present disclosure is to provide an apparatus and a method for controlling TCP connections to reduce energy overhead caused by transition from an idle state to an active state in a client such as smart phone.

Still another of the present disclosure is to provide an apparatus and a method for initiating TCP connection close in a client.

A further aspect of the present disclosure is to provide an apparatus and a method for processing proactive, batch, or combined TCP connection closes in a client.

According to one aspect of the present disclosure, a method of operating a client in a wireless communication system includes determining a data transfer inactivity time of at least one of Transmission Control Protocol (TCP) connections; and closing the at least one of TCP connections at the data transfer inactivity time.

According to another aspect of the present disclosure, a method of operating a client in a wireless communication system includes identifying at least one first Transmission Control Protocol (TCP) connection of which close is initiated by a server, among a plurality of TCP connections; and batching and closing the at least one first TCP connection with processing on at least one second TCP connection excluding the at least one first TCP connection among the TCP connections.

According to yet another aspect of the present disclosure, an apparatus of a client in a wireless communication system includes a controller configured to determine a data transfer inactivity time of at least one of Transmission Control Protocol (TCP) connections, and closing the at least one of TCP connection at the data transfer inactivity time.

According to still another aspect of the present disclosure, an apparatus of a client in a wireless communication system includes a controller configured to identify at least one first Transmission Control Protocol (TCP) connection of which close is initiated by a server, among a plurality of TCP connections, and batching and closing the at least one first TCP connection with processing on at least one second TCP connection excluding the at least one first TCP connection among the TCP connections.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present disclosure will be more apparent from the following description taken in conjunction with the accompanying drawings, in which.

Throughout the drawings, like reference numerals will be understood to refer to like parts, components and structures.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present disclosure is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure provide an apparatus and a method for controlling Transmission Control Protocol (TCP) connections in an electronic device (e.g., a client) such as smart phone, in order to improve a battery life time. The present disclosure can be applied to a computer device, for example, a network environment as shown in FIG. 1.

Figure 1:
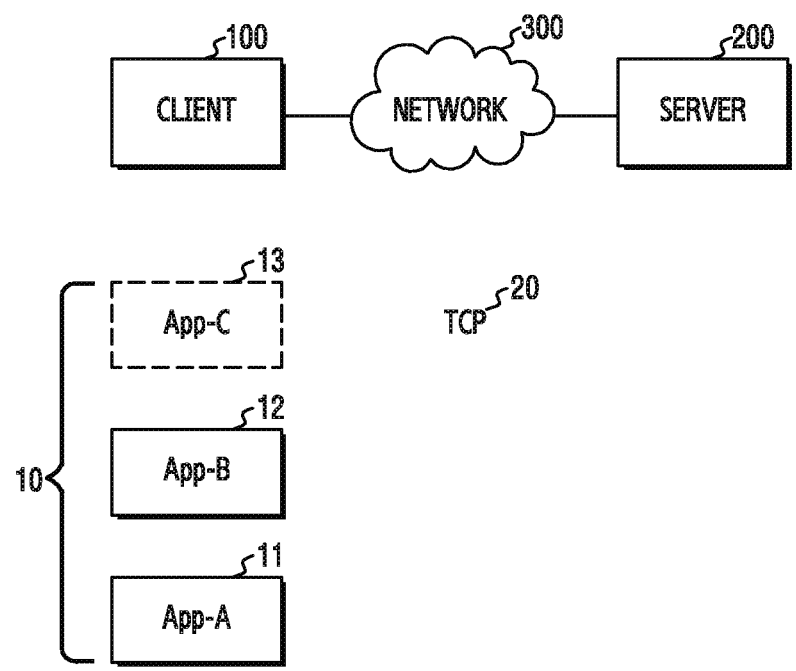
FIG. 1 illustrates a network environment according to an exemplary embodiment of the present disclosure.

Referring to FIG. 1, a client 100 is connected to a server 200 over a network 300. The network 300 can include a 3$^{rd}$ Generation (3G) or Long Term Evolution (LTE) wireless communication system. The client 100 can interact with the server 200 by running a plurality of applications 10 (e.g., App-A 11, App-B 12, and App-C 13), and thus exchange various contents with the server 200. The client 100 and the server 200 can be interconnected using a transmission protocol such as TCP. The client 100 can include various electronic devices or user terminals, for example, a smart phone.

The present method helps achieving a longer battery life after a prolonged inactive interval without degrading user experience or affecting application functionality without a need of changing application software.

Currently, TCP connections established by smart phone agents are persistent and non-persistent. Inactive non-persistent connections terminated by the server 300 cause network resources such as cellular radio to transit from an idle state to an active state. This phenomenon repeatedly affects power consumption. The present disclosure aims to optimize the TCP connection termination by the server 200 and thus increase the battery life of the client 100.

The present disclosure provides various methods for controlling and terminating the inactive non-persistent TCP connection at the client 100. That is, for example, at the smart phone end. The present methods use minimum radio state transition opportunities to thus reduce power consumption caused by a server-initiated TCP connection close.

Figure 7:
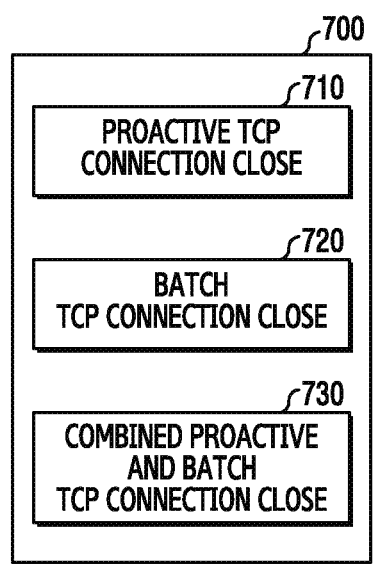
FIG. 7 illustrates a TCP connection close according to an exemplary embodiment of the present disclosure.

The present TCP connection close method includes a proactive TCP connection close 710, a batch delayed TCP connection close 720, and a combined proactive and batch TCP connection close 730 as shown in FIG. 7.

The present disclosure focuses on enhancing the battery life time by controlling the server-initiated TCP connection close and maintaining the same functionality as before.

The present method may lessen dependency on servers to close TCP connections and be applied to any application with specific and different server close timeouts. The present method may also minimize network resources at a client without additional support from network elements. Since the present disclosure is agnostic to network support, it may be deployed quickly.

The present method starts with capturing TCP connection information at an application transparent layer followed by a classification of TCP connections with respect to the persistent and non-persistent connections. To attain high preciseness and accuracy of the classification, time taken to re-establish connection after a TCP connection close is monitored.

A persistent connection is determined for a connection where the data exchange is always available between a client and a server by using one or more successive TCP connections.

Exemplary operations of detecting non-persistent connections can be, but not limited to, as follows:

1) Life time of a connection is longer than a predetermined time.

2) A similar TCP connection is re-established within a predetermined time after a previous TCP connection close and a predetermined number of times. The similar TCP connection indicates the same hostname or destination Internet Protocol (IP) address and/or a port of the TCP connection in a cache or a Database (DB).

Figure 6A:
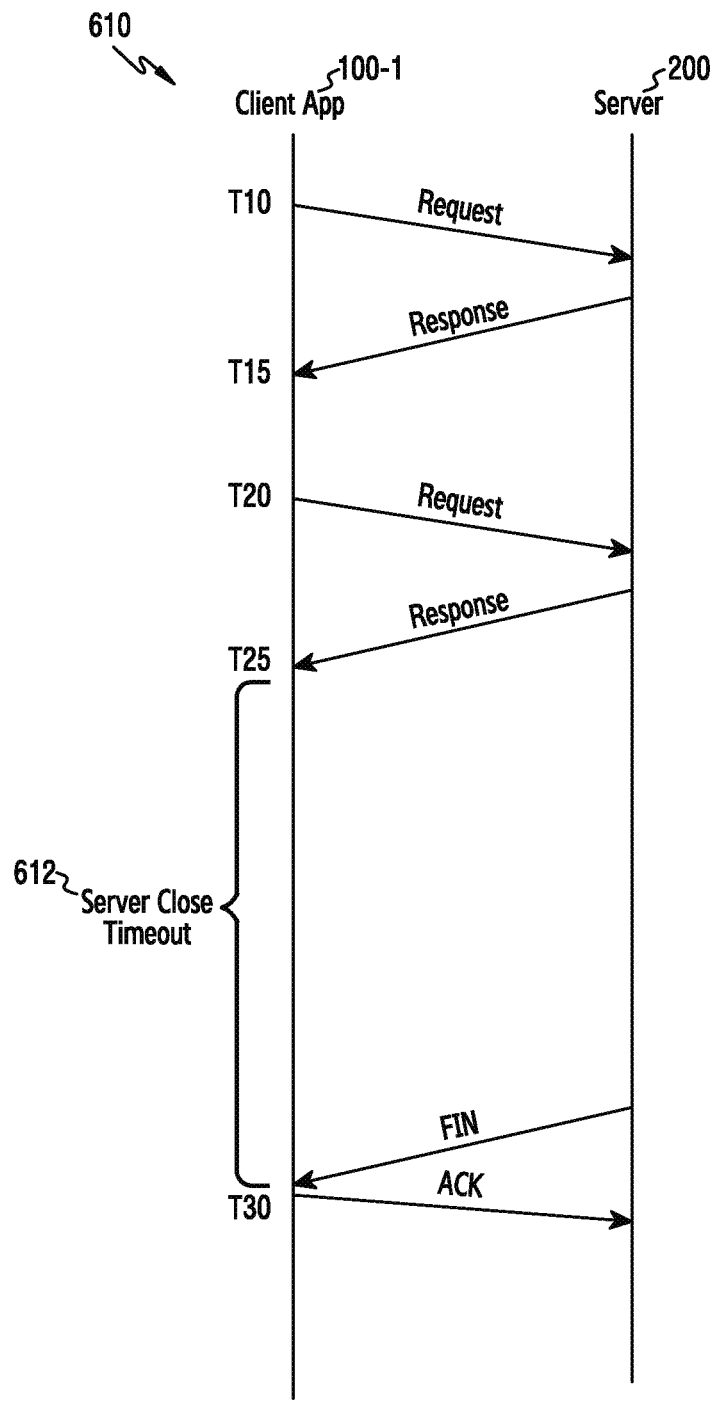
FIG. 6A illustrates a method for detecting a server-initiated TCP connection close time according to an exemplary embodiment of the present disclosure.

The present disclosure aims at calculating various attributes from an ongoing TCP connection. These attributes can include, but not limited to, one or more of the following:

1) A server close timeout: As shown in FIG. 6A, a server close timeout 612 is a time spent between a last data transfer and a close initiated by the server 200.

a) The last data transfer indicates a last response time T25 (to a corresponding client request) from the server 200.

b) The close initiated by the server 200 indicates a TCP Finish (FIN) packet reception time T30 from the close initiated by the server 200.

Figure 6B:
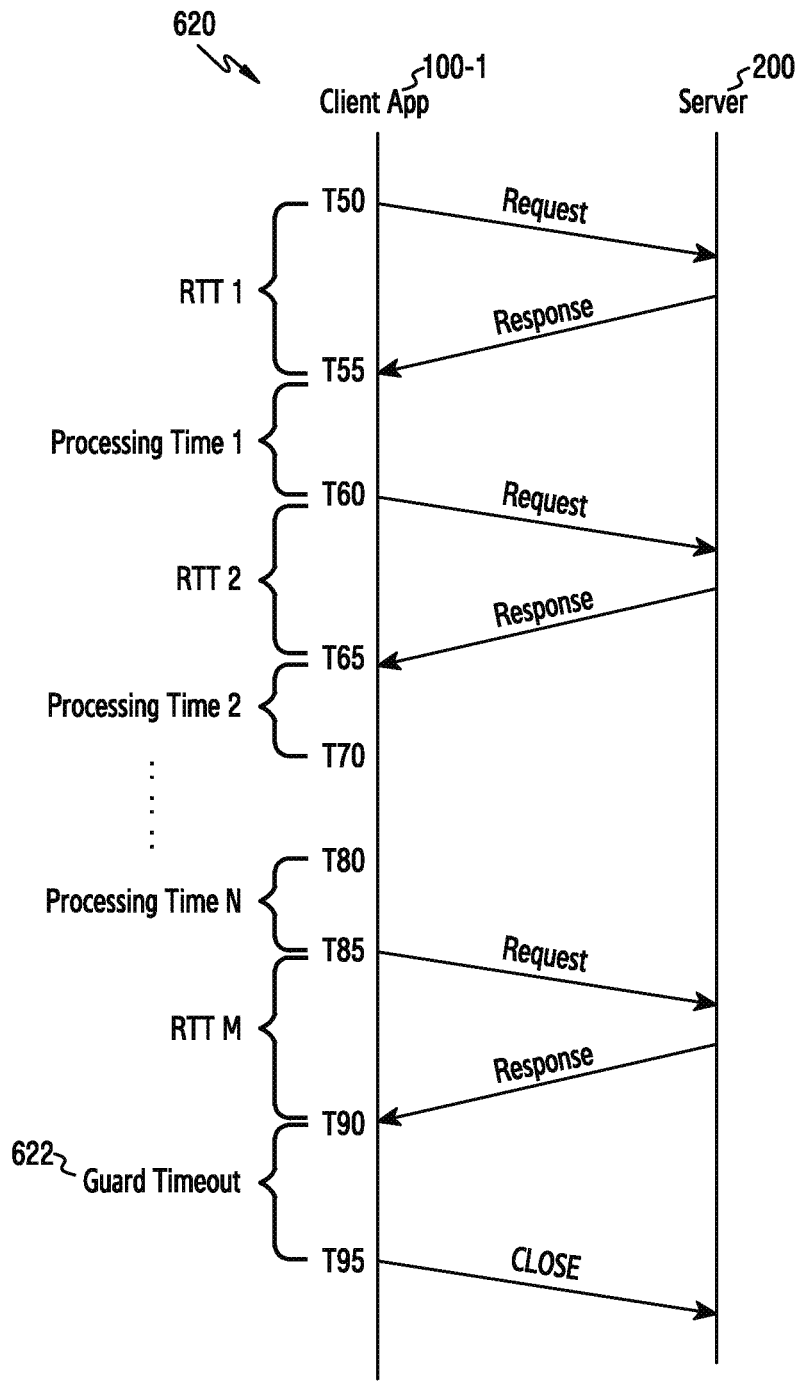
FIG. 6B illustrates a method for detecting a guard timeout according to an exemplary embodiment of the present disclosure.

2) Guard timeout: As shown in FIG. 6B, a guard timeout 622 is the earliest time after the last data transfer after which there is not any more data transfer between the server 200 and a specific client application 100-1. The earliest time after the last data transfer indicates inactivity time prediction after consecutive requests and corresponding responses T85 and T90.

The present disclosure considers, but not limited to, an optimal method for calculating the server close timeout 612. Method for Detecting the Server Close Timeout FIG. 6A depicts a method for detecting a time of a server-initiated TCP connection close according to an exemplary embodiment of the present disclosure. The server-initiated close is triggered by the server 200 after a prolonged inactivity interval for data transfer.

A TCP server close timeout of the connections is calculated by monitoring a POLLRDHUP event in a poll system call. The POLLRDHUP event is triggered when a peer disconnects a connection. That is, the POLLRDHUP event is triggered when a remote end (e.g., the server 200) of the connection sends a TCP FIN packet (T30 of FIG. 6A).

Example Algorithm server close timeout=connection established time−
POLLRDHUP event triggered time (FIN receiving time)

The present disclosure considers, but not limited to, an optimal method for calculating the guard timeout as follows.

Method for Detecting the Guard Timeout

FIG. 6B depicts a method for detecting a guard timeout according to an exemplary embodiment of the present disclosure. A data transfer completion time or an inactivity time for non-persistent connections between a server (e.g., the server 200 of FIG. 1) and a mobile application (e.g., the App-A 11 of FIG. 1) is calculated using a function of a Round Trip Time (RTT) and a response processing time.

The guard timeout is the amount of time when a TCP connection socket is protected from a client-initiated close. This can be referred to as a protected timeout for the socket.

Calculation of the guard timeout is generally a function of an application processing time of a server's response (processing time N in FIG. 6B) and the RTT M of the request/response, that is, a delay between the request and the response.

The guard timeout value differs per TCP connection socket. The guard timeout value is updated dynamically based on a socket read and write time stamp during the life of the socket.

Example Algorithm

Guard Timeout=avg processing time+processing time variance+avg RTT+RTT variance. For example, Guard Timeout g(x) for TCP connection socket x may be as follows:

$$\text{Guard Timeout} = g(x) = \frac{1}{N} \sum_{i=1}^{n} (\text{processing Time}_i) +$$
$$w_1 * (\text{var}(\text{processing Time})) + \frac{1}{M} \sum_{i=1}^{m} (RTT_i) + w_2 * (\text{var}(RTT))$$

Calculation Details processing time=request sent time−last response received time, RTT=response received time−last request sent time, $$\frac{1}{N} \sum_{i=1}^{n} (\text{processing Time}_i) = \text{average processing time} =$$

sum of processing time/number of processing periods, where $N$ is the processing time, var(processing Time)=variance from the average processing time, $$\frac{1}{M} \sum_{i=1}^{m} (RTT_i) = \text{average } RTT = \text{sum of } RTTs/\text{number of } RTTs,$$

var(RTT)=variance from the average RTT,
$w_1$=weight factor for the processing time variance, and
$w_2$=weight factor for the RTT variance.

Figure 4:
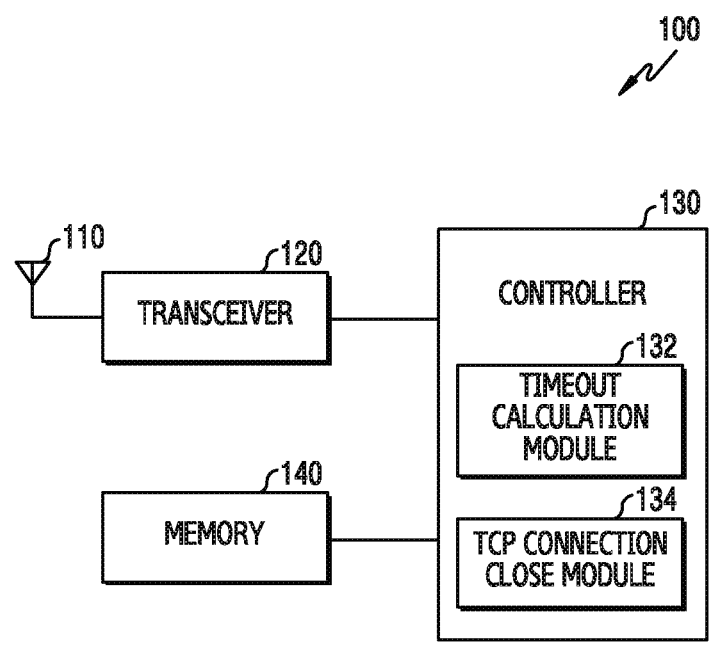
FIG. 4 illustrates a client according to an exemplary embodiment of the present disclosure.

FIG. 4 is a block diagram of a client device according to an exemplary embodiment of the present disclosure. For example, the client device can be the client 100 of FIG. 1.

Referring to FIG. 4, the client 100 includes an antenna 110, a transceiver 120, a controller 130, and a memory 140.

The antenna 110 transmits a signal processed by the transceiver 120 and receives a signal over a radio channel. The antenna 110 can include a plurality of antennas, an array antenna, or antenna elements, to support beamforming.

The transceiver 120 processes the signal to be transmitted and the received signal. For example, the transceiver 120 converts a baseband signal to a bitstream and vice versa according to a physical layer standard of a communication system. For the data transmission, the transceiver 120 generates complex symbols by encoding and modulating the transmit bitstream. The transceiver 120 can map the complex symbols to subcarriers and generate Orthogonal Frequency Division Multiplexing (OFDM) symbols using Inverse Fast Fourier Transform (IFFT). In the data reception, the transceiver 120 restores the received bitstream by demodulating and decoding the baseband signal. The transceiver 120 up-converts the baseband signal to a Radio Frequency (RF) signal, transmits the RF signal over the antenna 110, and down-converts an RF signal received over the antenna 110 to a baseband signal. For example, although not shown, the transceiver 120 may include a transmit filter, a receive filter, an amplifier, a mixer, an oscillator, a Digital-to-Analog Converter (DAC), and an Analog-to-Digital Converter (ADC).

The transceiver 120 may also include a plurality of RF chains. The transceiver 120 may also support the beamforming. For the beamforming, the transceiver 120 may adjust a phase and a level of signals transmitted and received via the antennas or antenna elements of the antenna 110. The transceiver 120 can precode a plurality of data streams transferred, so as to conduct Multi-User Multiple-Input Multiple-Output (MU-MIMO). The transceiver 120 transmits and receives the signals as stated above. The transceiver 120 can be referred to as a communication unit or a transceiving unit. In some cases, the transceiver 120 can be divided into a transmitter and a receiver, or a transmitting unit and a receiving unit.

The memory 140 stores a basic program for operating the transceiver 120, an application program, and data such as setup information. The memory 140 provides the stored data according to a request of the controller 130. For example, the memory 140 can store a program and/or instructions for a low-power TCP connection close of FIGS. 11 through 15.

The controller 130 controls the operations of the client 100 (of FIG. 1). For example, the controller 130 transmits and receives signals through the transceiver 120. The controller 130 records data to the memory 140 and reads the recorded or stored data from the memory 140. As such, in some embodiments, although not shown, the controller 130 may include one or more processors.

For the TCP connection control, the controller 130 includes a timeout calculation module 132 and a TCP connection close module 134. For the low-power TCP connection close, the timeout calculation module 132 calculates or estimates the server-initiated TCP connection close time and the guard timeout (or the data transfer inactivity time) with respect to each TCP connection. For example, the timeout calculation module 132 detects the server-initiated TCP connection close time as shown in FIG. 6A. The timeout calculation module 132 detects the guard timeout as shown in FIG. 6B.

Figure 13:
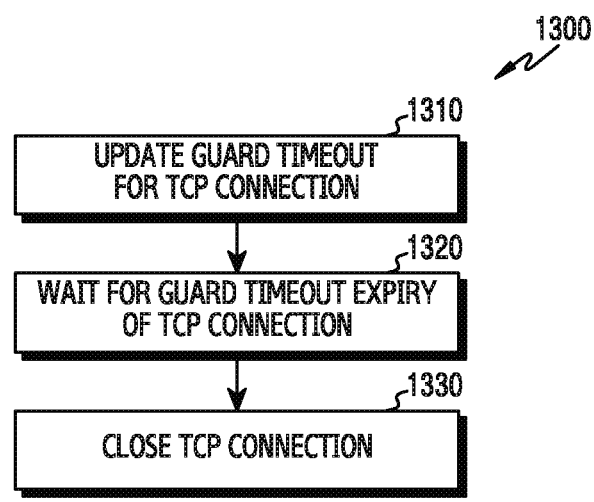
FIG. 13 illustrates a TCP control for a proactive close method on an inactive non-persistent TCP connection according to an exemplary embodiment of the present disclosure.
Figure 14:
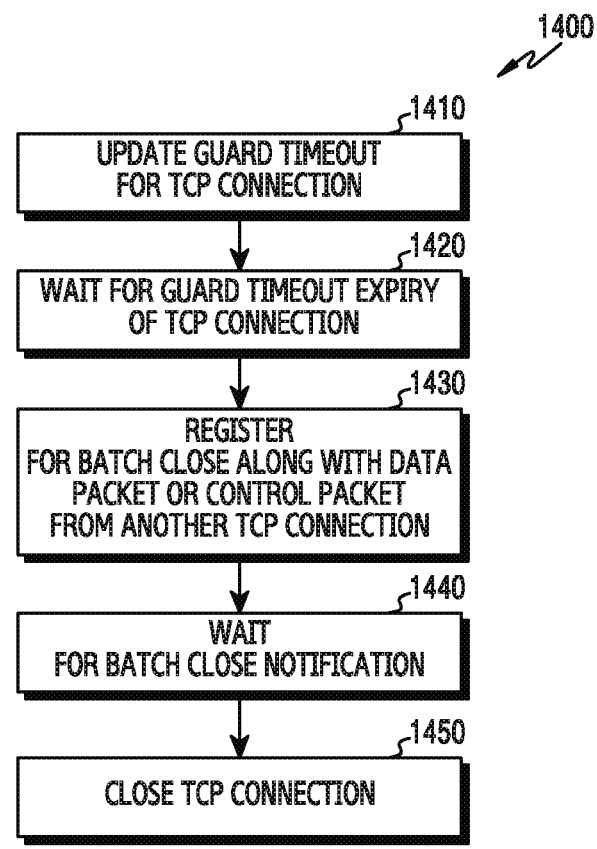
FIG. 14 illustrates a TCP control for a batch close method on an inactive non-persistent TCP connection according to an exemplary embodiment of the present disclosure.
Figure 15:
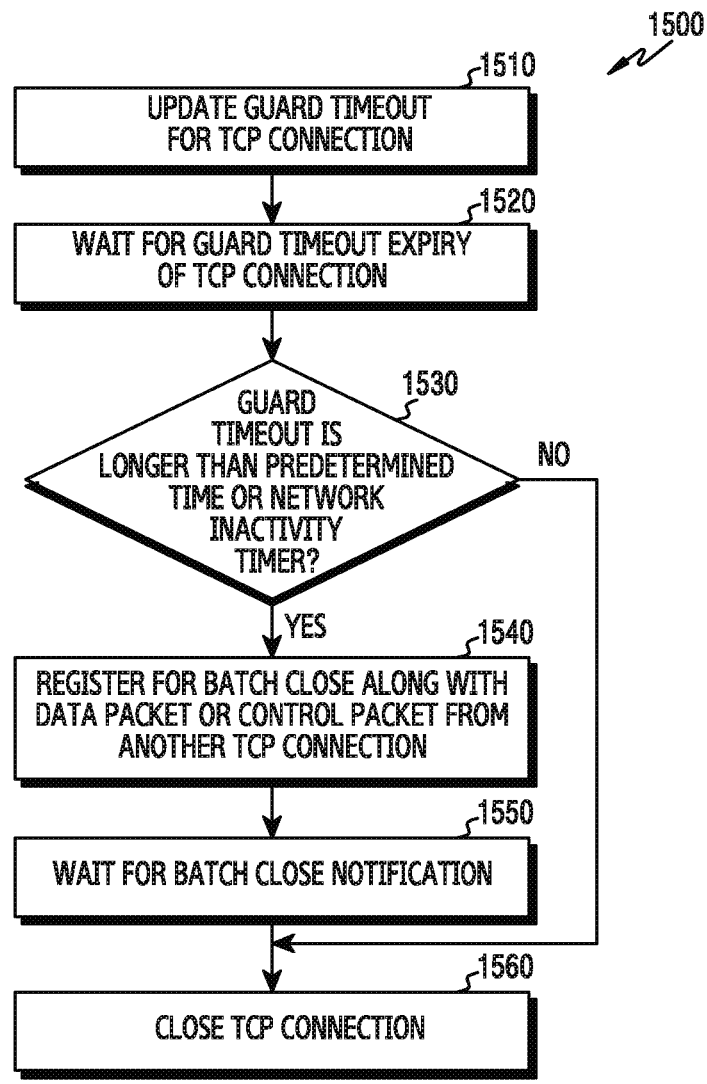
FIG. 15 illustrates a TCP control for a method of combining proactive and batch close methods on an inactive non-persistent TCP connection according to an exemplary embodiment of the present disclosure.

The TCP connection close module 134 performs a low-power TCP connection close. The TCP connection close module 134 conducts a proactive TCP connection close as shown in FIG. 13, detailed hereinafter. The TCP connection close module 134 also conducts a batch TCP connection close as shown in FIG. 14, detailed hereinafter. The TCP connection close module 134 also conducts a combined proactive and batch TCP connection close as shown in FIG. 15, detailed hereinafter.

The controller 130 determines the data transfer inactivity time for at least one of the TCP connections, and terminates the at least one TCP connection at the data transfer inactivity time.

The data transfer inactivity time can be determined based on the RTT from the request transmission and the response reception in relation to the TCP connection between the client 100 and the server 200, and the processing time until a next request transmission after a response is received from the server 200.

The data transfer inactivity time is ahead of the server-initiated TCP connection close time. The server-initiated TCP connection close may be performed in response to a message indicating the TCP connection close received from the server.

The controller 130 identifies at least one first TCP connection of which the closure is initiated by the server 200 among the TCP connections, and batches and terminates the at least one first TCP connection and at least one second TCP connection excluding the first TCP connection among the TCP connections.

The processing on the at least one second TCP connection can include one of a connection, a closure, and a transmitting and/or receiving operation of data packet for the at least one second TCP connection.

The controller 130 can identify the at least one first TCP connection among the TCP connections in response to the close message received from the server.

The controller 130 may identify the at least one first TCP connection when the data transfer inactivity time of the first TCP connection is greater than a predetermined reference time, and may batch and terminate the at least one first TCP connection. When the data transfer inactivity time of the at least one first TCP connection is not greater than the reference time, the controller 130 may terminate the at least one first TCP connection at the data transfer inactivity time.

The data transfer inactivity time may also be determined based on the RTT from the request transmission and the response reception in relation to the at least one TCP connection between the client 100 and the server 200, and the processing time until the next request transmission after a response is received from the server 200.

The data transfer inactivity time may be ahead of the server-initiated close time of the at least one first TCP connection. The server-initiated first TCP connection close may be performed in response to the message indicating the at least one first TCP connection close received from the server 200.

Figure 5:
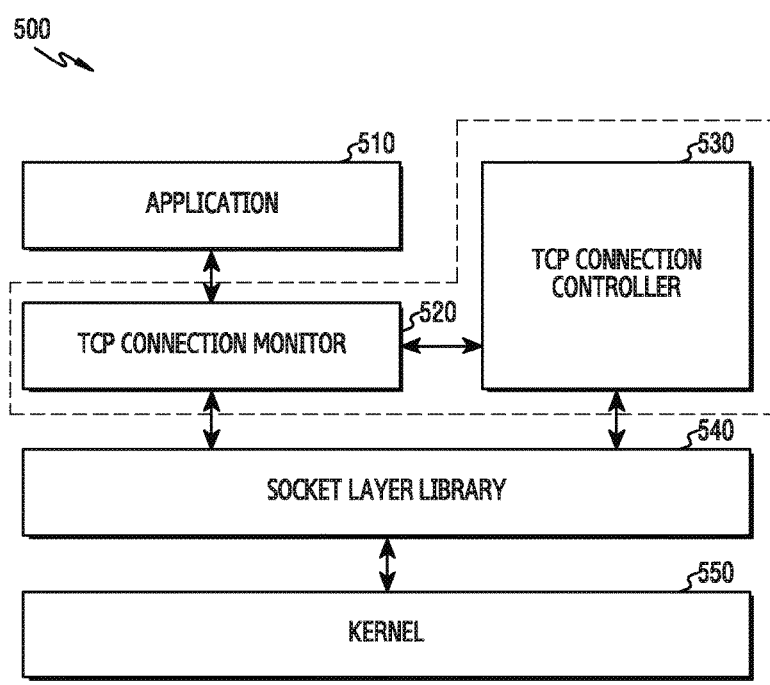
FIG. 5 illustrates overall software architecture for Low Power Transmission Control Protocol (LPTCP) according to an exemplary embodiment of the present disclosure.

FIG. 5 depicts software architecture 500 employing a Low Power Transmission Control Protocol (LPTCP) according to an exemplary embodiment of the present disclosure. For example, the architecture 500 may be controlled by the controller 130 of FIG. 4. FIG. 5 shows network software components used by applications and the LPTCP deployed in the software architecture 500.

Referring to FIG. 5, the architecture 500 includes an application 510, a TCP connection monitor (or wrapper) 520, a TCP connection controller 530, a socket layer library (or Library for C (LIBC)) 540, and a kernel 550. In some embodiments, the software architecture 500 may include, but not limited to, the TCP connection monitor 520 and the TCP connection controller 530.

As shown in FIG. 5, all of network transmissions take place over the socket layer library 540. The TCP connection monitor 520 is a wrapper over the socket layer library 540, for example, the LIBC.

Roles and responsibilities of the TCP connection monitor 520 may include, but not limited to, the following:

a) The TCP connection monitor 520 may monitor socket call (e.g., socket, close, read, write, send/sendto, recv/recvfrom, getaddrinfo) operations.

b) The TCP connection monitor 520 may also identify the server-initiated TCP connection close by calling a poll( ) function to check POLLRDHUP, indicating stream socket peer closed connection, or shut down writing half of the connection, as a return value.

c) The TCP connection monitor 520 may also identify the server-initiated TCP connection close by monitoring TCP connection state change to CLOSE_WAIT or LAST_ACK state.

d) The TCP connection monitor 520 may shut down a TCP connection.

e) The TCP connection monitor 520 may initiate shutdown of a TCP connection in a standalone mode.

f) The TCP connection monitor 520 may be the wrapper to socket calls (e.g., in the LIBC library).

g) The TCP connection monitor 520 may be a modified socket layer.

The TCP connection controller 530 may be an independent process deployed on a smart phone. The TCP connection controller 530 interacts with the TCP connection monitor 520 as a decision unit that notifies a decision and a time to proactively close inactive TCP connections.

Roles and responsibilities of the TCP connection controller 530 can include, but not limited to, the following:

a) The TCP connection controller 530 may initiate a notification for terminal-side close of a TCP connection.

b) The TCP connection controller 530 may coordinate batch TCP connection closes for one or more TCP connection monitors (e.g., the TCP connection monitor 520) along with any TCP connection connect or close function invoked.

c) The TCP connection controller 530 may coordinate batch TCP connection closes for one or more TCP connection monitors (e.g., the TCP connection monitor 520) along with any transmitting or receiving of data packets by monitoring a network layer through a raw socket packet capture library (e.g., libpcap) (not shown).

d) The TCP connection controller 530 may coordinate batch TCP connection closes for one or more TCP connection monitors (e.g., the TCP connection monitor 520) along with any transmitting or receiving of data packets by monitoring a packet count change in network statistics.

The present disclosure provides, but not limited to, the following methods for achieving higher battery life against power consumption due to random server-initiated TCP connection closes. As stated earlier, the TCP connection close methods include a proactive TCP connection close 710, a batch delayed TCP connection close 720, and a combined proactive and batch TCP connection close 730 as shown in FIG. 7.

Proactive TCP Connection Close

Figure 3A:
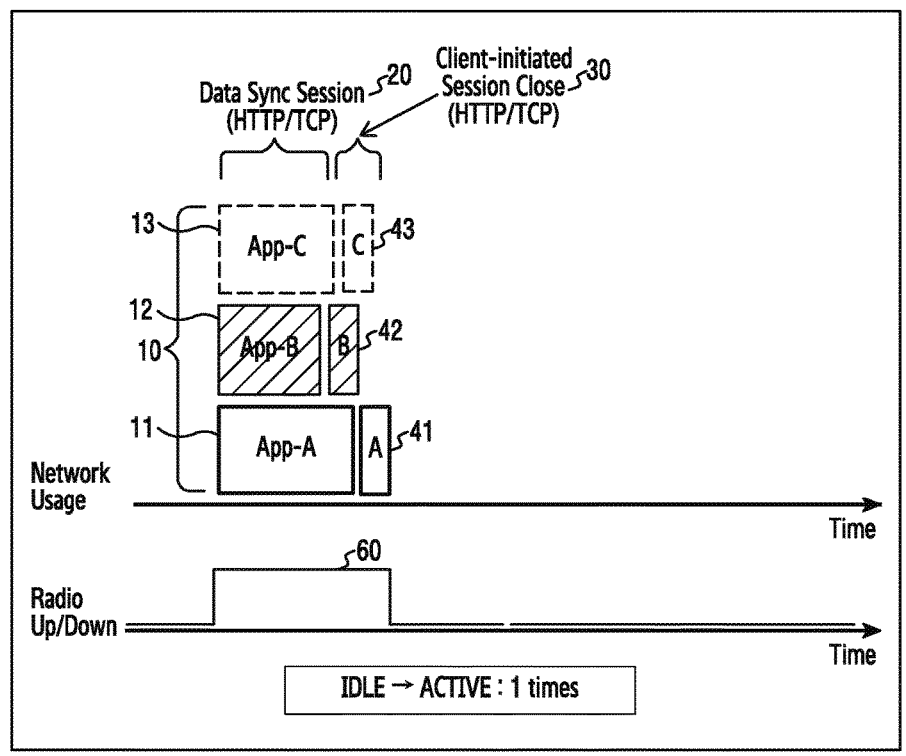
FIG. 3A illustrates a proactive TCP connection close according to an exemplary embodiment of the present disclosure.

FIG. 3A depicts a proactive TCP connection close according to an exemplary embodiment of the present disclosure, which can be initiated by the client 100 of FIG. 1.

Referring to FIG. 3A, inactive TCP connections 41, 42, and 43 are proactively closed, resulting in no additional radio state transition. This is because the close period of the TCP connections 41, 42, and 43 is configurable as a minimum time of a radio activity period. Inactive non-persistent TCP connections (e.g., the connections 41, 42, and 43) are first terminated by the client 100. The client 100 calculates a server timeout of a server-initiated TCP connection close, and immediately terminates the inactive non-persistent TCP connection before the calculated server timeout during a safe close time.

Figure 2:
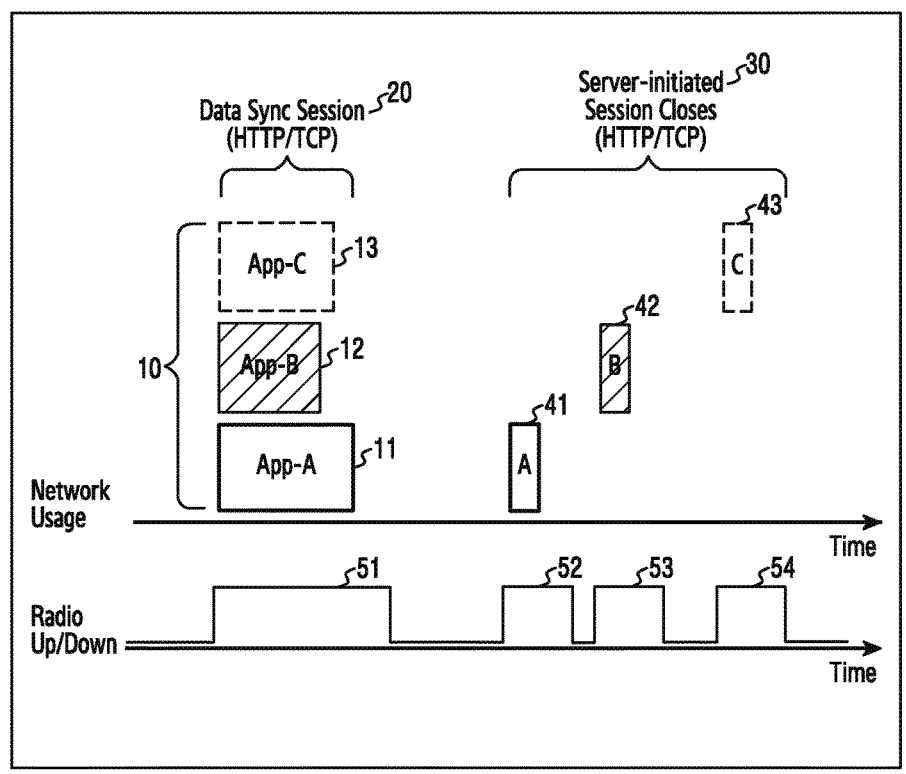
FIG. 2 illustrates server-initiated Transmission Control Protocol (TCP) connection close in a client according to an exemplary embodiment of the present disclosure.

App-A 11, App-B 12, and App-C 13 initiate a data sync operation at the same time in operation 20. Due to the data sync operation, the radio state transitions from an idle state to an active state once in operation 60. For example, four radio state transitions as shown in FIG. 2 are reduced to one transition as shown in FIG. 3A. In the active radio state, the power consumption remains while a state is alive. Exploiting this opportunity, the TCP connection controller 530 of FIG. 5 closes the still inactive but established TCP connections 41, 42, and 43.

By contrast, as shown in FIG. 2, to close the TCP connections 41, 42, and 43 for three applications App-A 11, App-B 12, and App-C 13, there may four instances transitions 51 through 54 for a radio state to change from an idle state to an active state. As the number of the radio state changes increases, the power consumption of the client 100 rises.

A guard timeout is a decision attribute from an ongoing data transfer to make a proactive TCP connection close decision.

Figure 9A:
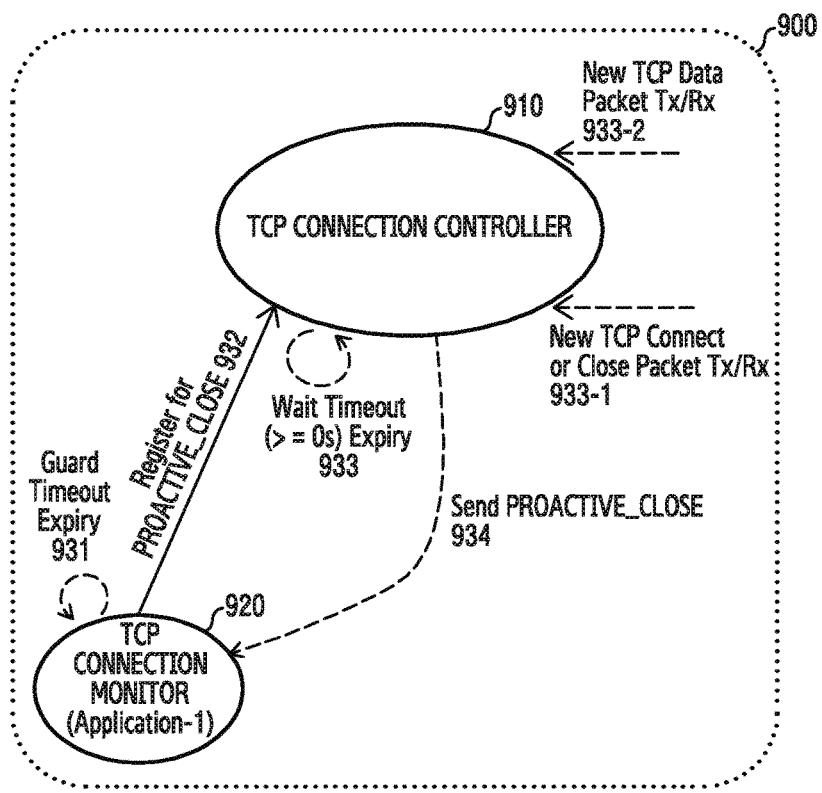
FIG. 9A illustrates a proactive TCP connection close according to an exemplary embodiment of the present disclosure.

FIG. 9A depicts proactive TCP connection close 900 according to an exemplary embodiment of the present disclosure. In this embodiment, a TCP connection controller 910 and a TCP connection monitor 920 on an application (Application 1) interact with each other.

As shown in FIG. 9A, the TCP connection controller 910 and the TCP connection monitor 920 interact with the following communication operations.

a) The TCP connection monitor 920 having an overdue guard timeout registers for a proactive TCP close to the TCP connection controller 910 in operations 931 and 932, respectively.

b) The TCP connection controller 910 waits for a TCP connect or close in operation 933-1, new packet transaction in operation 933-2, or timeout expiry in operation 933-3. When one of them occurs, the TCP connection controller 910 sends a proactive close message to the TCP connection monitor 920 in operation 934.

Figure 9B:
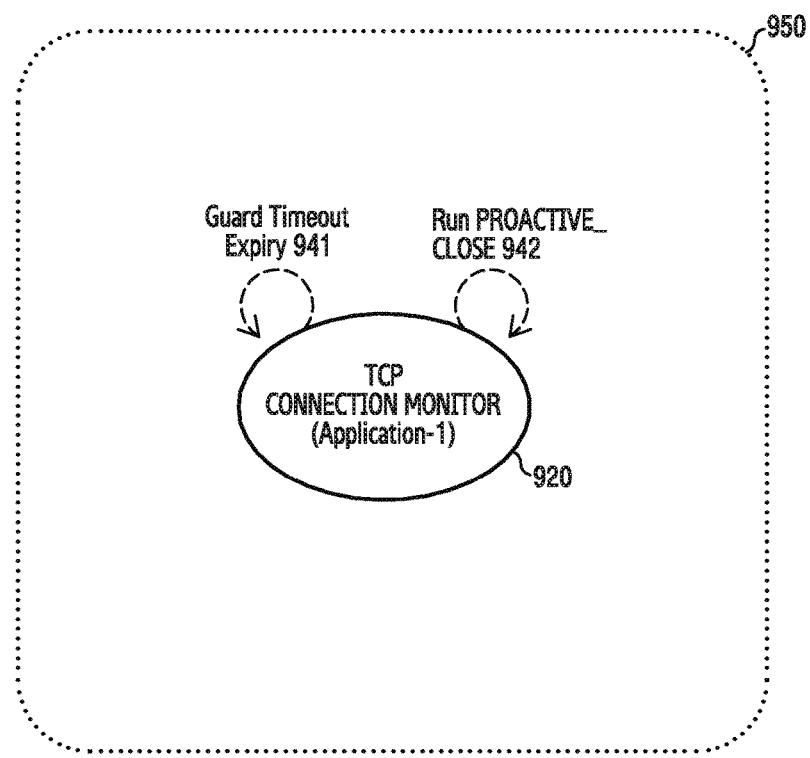
FIG. 9B illustrates a proactive TCP connection close according to another exemplary embodiment of the present disclosure.

FIG. 9B depicts a proactive TCP connection close 950 according to another exemplary embodiment of the present disclosure, based on a scenario where the TCP connection controller 910 (of FIG. 9A) is not available. Such a standalone mode may be deployed based on the application (Application 1).

Referring to FIG. 9B, the TCP connection monitor 920 is equipped with functionality to initiate the proactive TCP connection close 950 in the standalone mode. The TCP connection monitor 920 that has an overdue guard timeout 941 performs a proactive TCP connection close 942.

Batch Delayed TCP Connection Closes

Figure 3B:
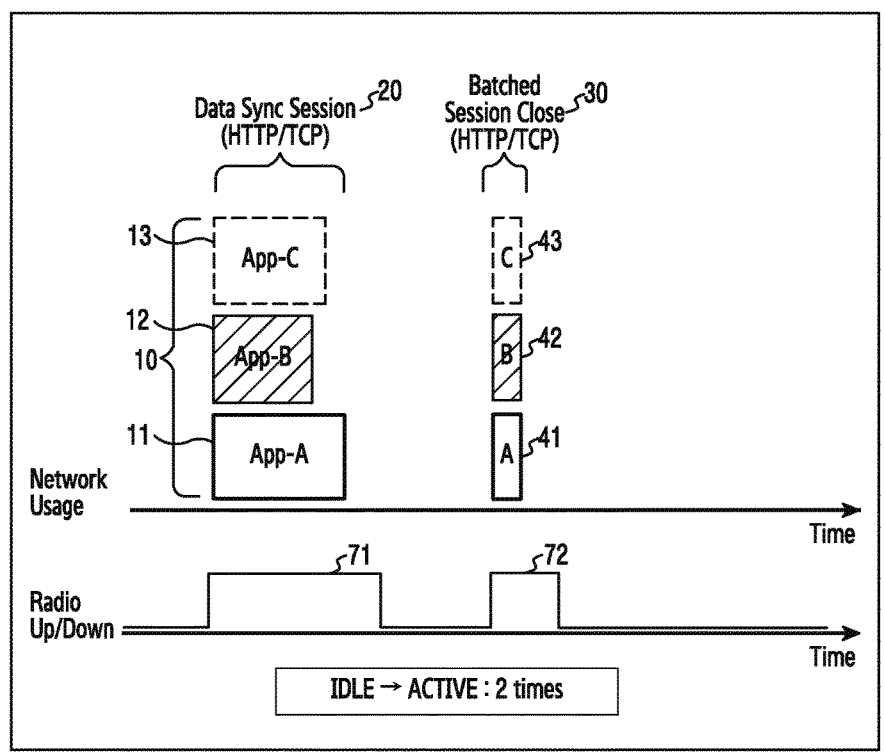
FIG. 3B illustrates a batch delayed TCP connection close according to an exemplary embodiment of the present disclosure.

FIG. 3B depicts a batch delayed TCP connection close according to an exemplary embodiment of the present disclosure, which initiates the multiple TCP connections 41, 42, and 43 to be closed as a batch on inactive non-persistent connections. The method of FIG. 2 prevents repeated radio state transition from an idle state to an active state.

To close the TCP connections 41, 42, and 43 as the batch, a single radio transition 72 from the idle state to the active state is caused. The inactive non-persistent TCP connection is terminated with other TCP connection at the same time. When the server-initiated TCP connection close is inactive, the inactive TCP connection (e.g., the connection 41) is terminated as the batch with the connection or the closure of other TCP connection (e.g., the connections 42 and 43).

Referring to FIG. 3B, App-A 11, App-B 12, and App-C 13 initiate a data sync operation 20 at the same time. Due to the data sync operation, the radio state transitions from an idle state to an active state in operation 71. However, due to varied data transfer activity times, the TCP connection closes can be independently delayed.

The guard timeout value varies for each of the TCP connections 41, 42, and 43 of the applications 10. Hence, multiple radio state transitions are prevented by batching all of the TCP connections 41, 42, and 43 together in operation 30. For example, the four radio state transitions as shown in FIG. 2 are reduced to two transitions 71, 72.

Figure 10A:
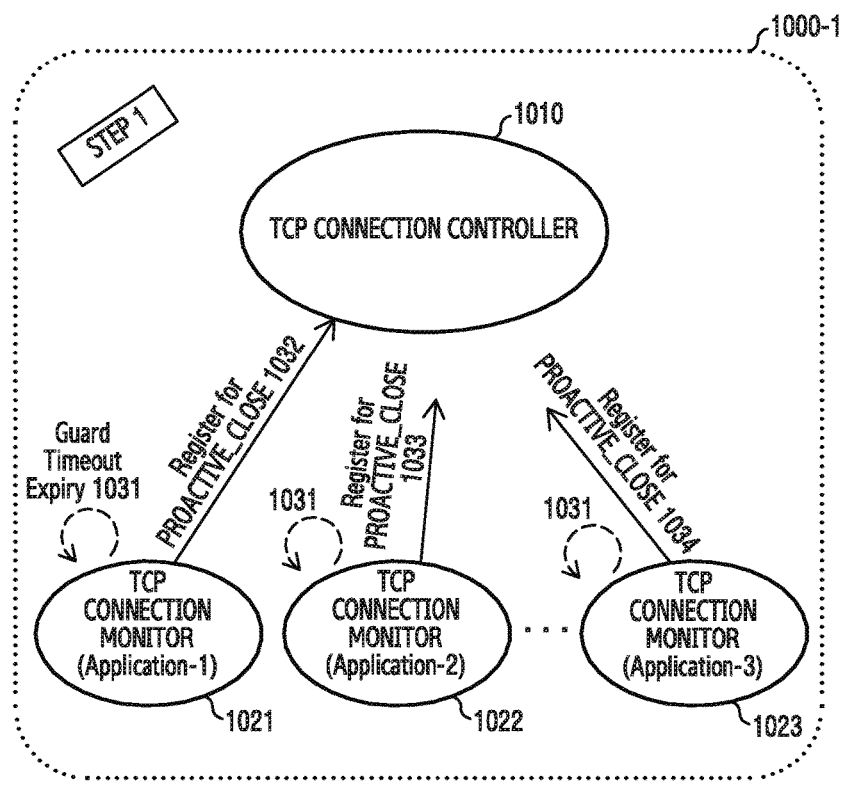
FIGS. 10A and 10B illustrate batch delayed TCP connection closes according to an exemplary embodiment of the present disclosure.
Figure 10B:
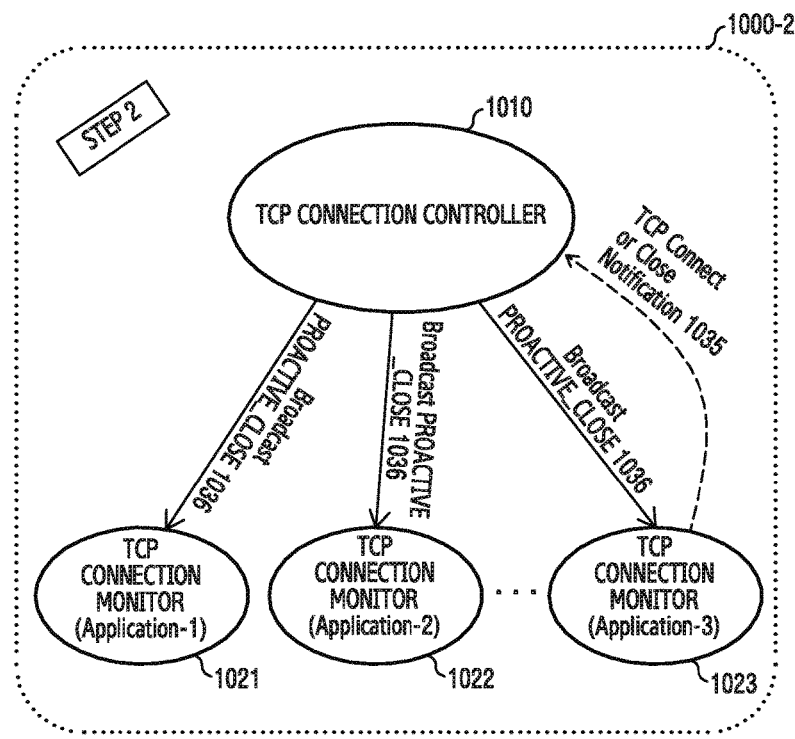

FIGS. 10A and 10B depict batch operations 1000-1 and 1000-2 of delayed TCP connection closes, respectively, according to an exemplary embodiment of the present disclosure. As shown in FIGS. 10A and 10B, a TCP connection controller 1010 generally maintains a constant interaction with multiple TCP connection monitors 1021, 1022, and 1023 at respective applications (Application 1, Application 2, and Application 3).

As shown in FIGS. 10A and 10B, the TCP connection controller 1010 and the TCP connection monitors 1021, 1022, and 1023 interact with the following communication operations:

a) The TCP connection monitors 1021, 1022, and 1023 having an overdue guard timeout 1031 register almost simultaneously for a proactive TCP batch close with the TCP connection controller 1010 in operations 1000-1 of FIG. 10A, and 1032 through 1034.

b) The TCP connection controller 1010 waits for the proactive TCP close or a minimum server timeout in operation 1000-2 of FIG. 10B and 1035, and sends a TCP batch close message when it occurs.

c) After receiving a proactive TCP batch close message from the TCP connection controller 1010 with operations 1036, the TCP connections are batched and closed by the TCP connection monitors 1021, 1022, and 1023, respectively.

Combined Proactive and Batch TCP Connection Close

Figure 8:
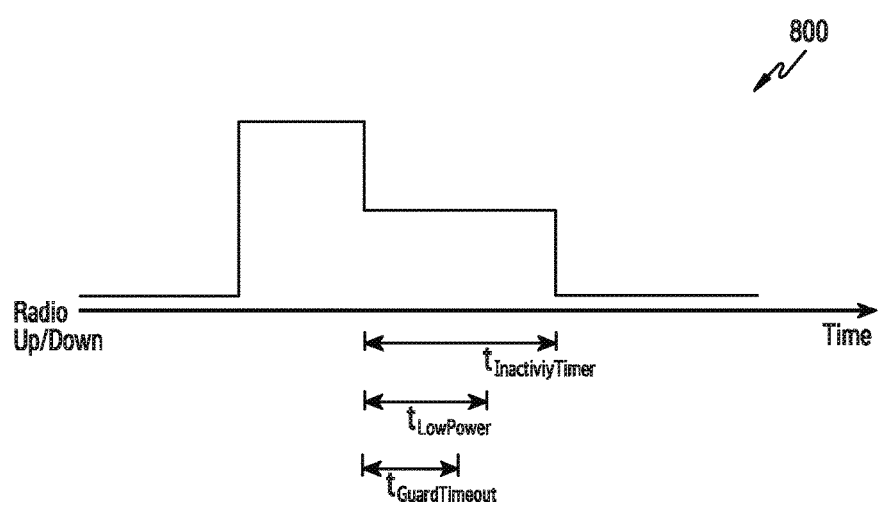
FIG. 8 illustrates a combination of proactive and batch TCP connection closes according to an exemplary embodiment of the present disclosure.

FIG. 8 depicts a combined proactive and batch TCP connection close according to an exemplary embodiment of the present disclosure.

This method includes a combination of a proactive TCP connection close and a batch TCP connection close. The client 100 terminates an inactive non-persistent TCP connection before a server-initiated close arises, or terminates the inactive non-persistent TCP connection at the same time as other TCP connection establishes or closes. The client 100 normally operates in a proactive close mode. When expecting considerable radio tail increase due to the proactive close, the client 100 enters a batch close mode. For example, when $t_{Guard\ Timeout} > t_{Inactivity\ Timer}$, the client 100 operates in a batch close mode. For example, when $t_{Guard\ Timeout} < t_{Low\ Power}$, the client 100 operates in a proactive close mode. This method corresponds to the cumulative power saving benefits of the two methods. A predetermined guard timeout value is used.

Figure 11:
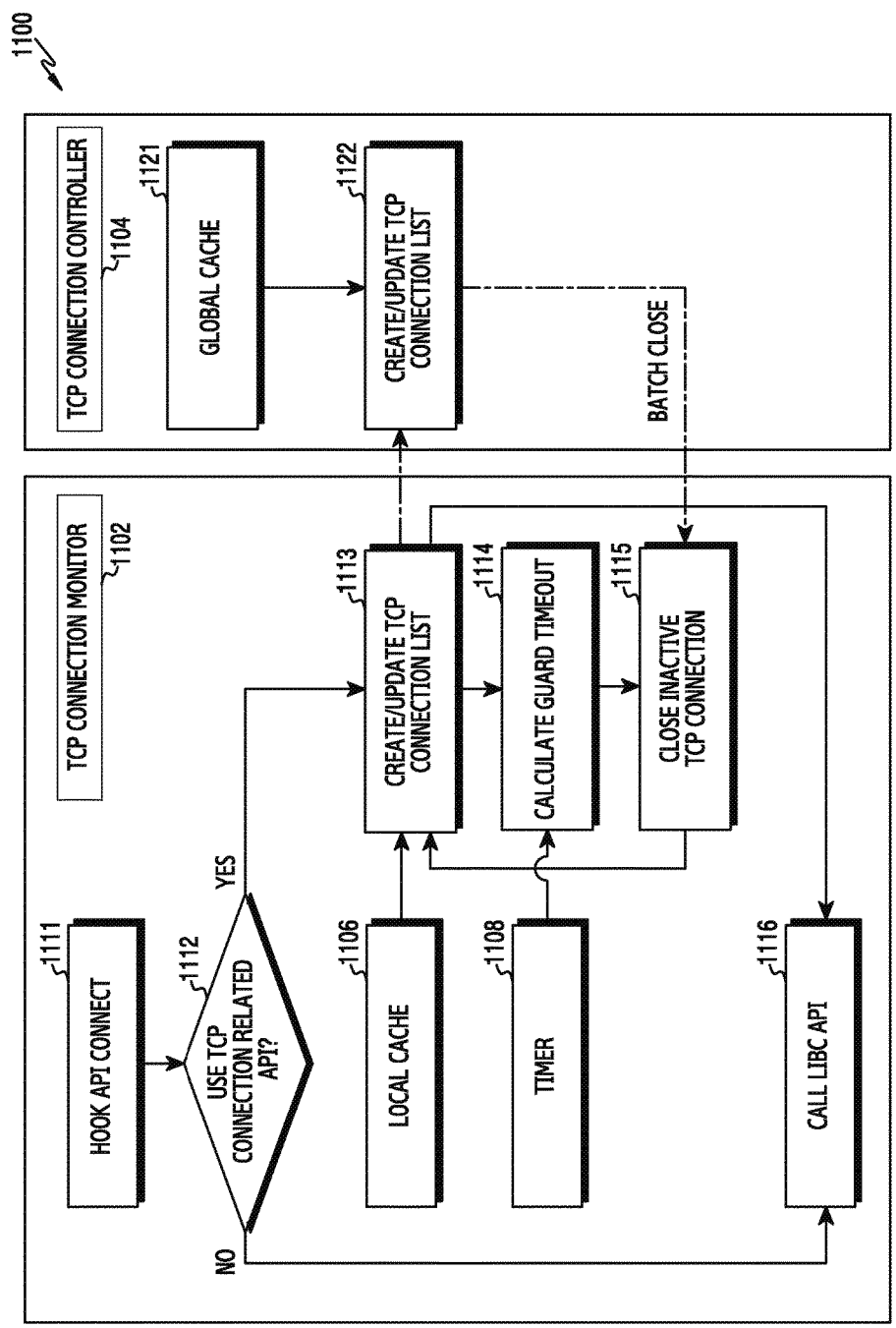
FIG. 11 illustrates an overall TCP control flow according to an exemplary embodiment of the present disclosure.

FIG. 11 depicts overall flow between a TCP connection monitor 1102 and a TCP connection controller 1104 for TCP control according to an exemplary embodiment of the present disclosure. The TCP connection monitor 1102 performs the following operations:

1) The TCP connection monitor 1102 hooks socket Application Program Interfaces (APIs) such as socket, connect, read, write, and so on in operation 1111.

2) The TCP connection monitor 1102 checks whether to use TCP connection related API in operation 1112. If so, the TCP connection monitor 1102 goes to operation 1113. Otherwise, the TCP connection monitor 1102 goes to operation 1116.

3) The TCP connection monitor 1102 creates a new entry in a TCP connection monitor scope when a new socket is created. Otherwise, the TCP connection monitor 1102 updates the existing TCP connection list (or entry) with metadata such as time stamp, guard timeout, or server timeout in operation 1113.

The TCP connection monitor 1102 updates TCP metadata into the TCP connection controller 1104 for batching the TCP close in operation 1122.

When a connection is a server-initiated close, the TCP connection monitor 1102 goes to operation 1114. Otherwise, the TCP connection monitor 1102 goes to operation 1116.

4) The TCP connection monitor 1102 calculates the guard timeout based on the time stamp of TCP socket read/write operation and triggers the timer for guard time expiry notification in operation 1114.

5) The TCP connection monitor 1102 closes the TCP connection once the guard time is expired or the batch close notification is received from the TCP connection controller 1104 in operation 1115.

6) The TCP connection monitor 1102 calls the corresponding LIBC API in operation 1116.

The TCP connection controller 1104 performs the following operations:

1) TCP connection controller 1104 waits for a request from the TCP connection monitor 1102 in operation 1121.

2) Upon receiving the request from the TCP connection monitor 1102, the TCP connection controller 1104 creates a memory entry of the TCP connection monitor 1102 or updates the existing entry in operation 1122.

3) The TCP connection controller 1104 makes a decision on a batch close approach and multicasts TCP close notification to the TCP connection monitor 1102 in operation 1115.

Figure 12:
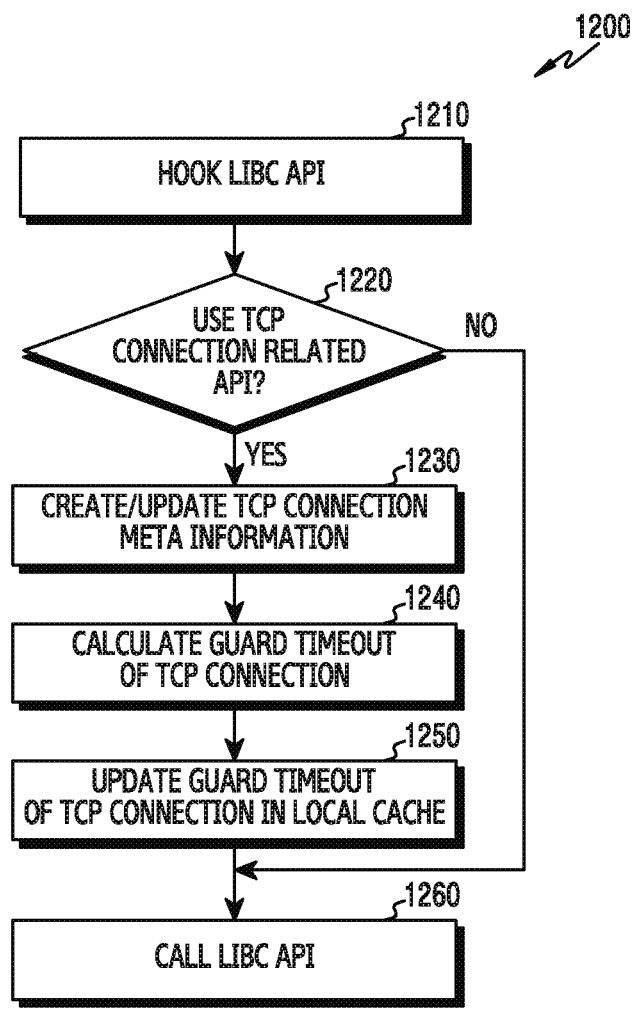
FIG. 12 illustrates a TCP control for estimating a data transfer inactivity time or a guard timeout according to an exemplary embodiment of the present disclosure.

FIG. 12 illustrates a method 1200 for calculating a data transfer inactivity time or a guard timeout according to an exemplary embodiment of the present disclosure. For example, the method 1200 can be performed by the TCP connection monitor 1102 and the TCP connection controller 1104 of FIG. 11.

1) In operation 1210, hook the socket APIs such as socket, connect, read, write, etc.

2) In operation 1220, determine whether the socket is a TCP socket or not. Upon identifying the TCP socket, go to operation 1230. Otherwise, go to operation 1260.

3) In operation 1230, create/update the TCP metadata such as server IP, port, domain name, server timeout, etc.

4) In operation 1240, calculate the guard timeout based on the time stamp of the TCP socket read/write operation.

5) In operation 1250, update the guard timeout in TCP connection metadata, that is, a local cache.

6) In operation 1260, call the corresponding LIBC API.

FIG. 13 illustrates a TCP control method 1300 for a proactive close on an inactive non-persistent TCP connection according to an exemplary embodiment of the present disclosure. For example, the method 1300 can be performed by the TCP connection monitor 1102 and the TCP connection controller 1104 of FIG. 11.

1) In operation 1310, dynamically calculate the guard timeout based on the TCP socket read/write operation and set a timer for guard timeout expiry notification.

2) In operation 1310, reset the timer when the socket read/write occurs in between.

3) In operation 1320, wait for the guard timeout expiry.

4) In operation 1330, close the TCP connection.

FIG. 14 illustrates a TCP control method 1400 for a batch close on an inactive non-persistent TCP connection according to an exemplary embodiment of the present disclosure. For example, the method 1400 can be performed by the TCP connection monitor 1102 and the TCP connection controller 1104 of FIG. 11.

1) In operation 1410, dynamically calculate the guard timeout based on the TCP socket read/write operation and set the timer for the guard timeout expiry notification.

2) In operation 1410, reset the timer when socket read/write happens in the middle of the set timer.

3) In operation 1420, wait for the guard timeout expiry.

4) In operation 1430, when the guard timeout is longer than a normal value or a reference value, register for the batch close along with a data packet or a control packet from another TCP connection.

5) In operation 1440, wait for the batch close notification from the TCP connection controller 1104.

6) In operation 1450, the TCP connection monitor 1102 closes the TCP connection when receiving the batch close notification from the TCP connection controller 1104.

FIG. 15 illustrates a TCP control method 1500 for combining proactive and batch closes on an inactive non-persistent TCP connection according to an exemplary embodiment of the present disclosure. For example, the method 1500 can be performed by the TCP connection monitor 1102 and the TCP connection controller 1104 of FIG. 11.

a) In operation 1510, the guard timeout for a TCP connection is updated in the TCP connection monitor 1102.

b) After the guard timeout value is expired in operation 1520, compare the guard timeout value with a predetermined reference time or a network inactivity timer value in operation 1530. The expiry of the guard timeout is inferred as the start of network inactivity.

c) When the guard timeout value is lesser than a predetermined threshold, conduct the proactive TCP connection close in operation 1560.

d) When the guard timeout is greater than the predetermined threshold, register the batch request of other ongoing connections to the TCP connection controller 1104 in operation 1540.

e) In operation 1550, wait for a batch close notification from the TCP connection controller 1104.

f) In operation 1560, when receiving the batch close notification from the TCP connection controller 1104, the TCP connection monitor 1102 closes the TCP connection.

Figure 16A:
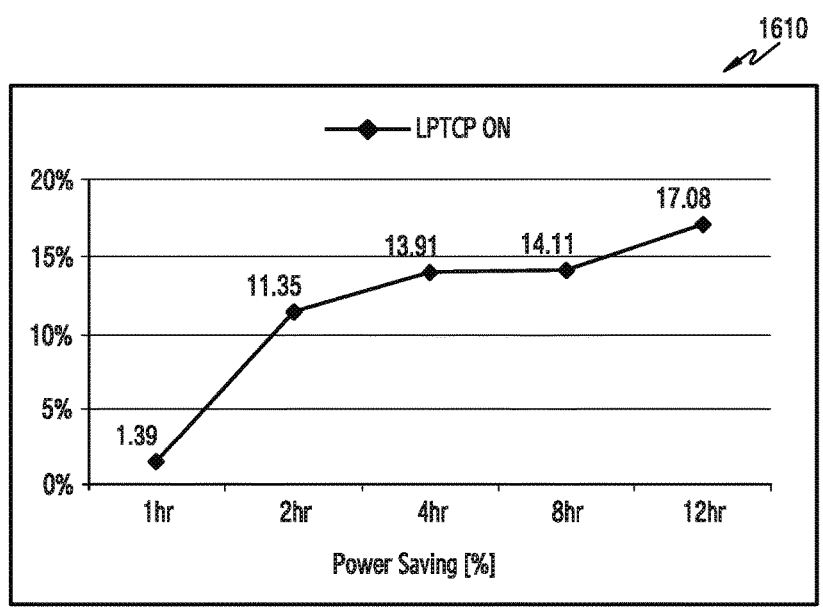
FIGS. 16A and 16B illustrate power saving test results in a TCP control according to an exemplary embodiment of the present disclosure.
Figure 16B:
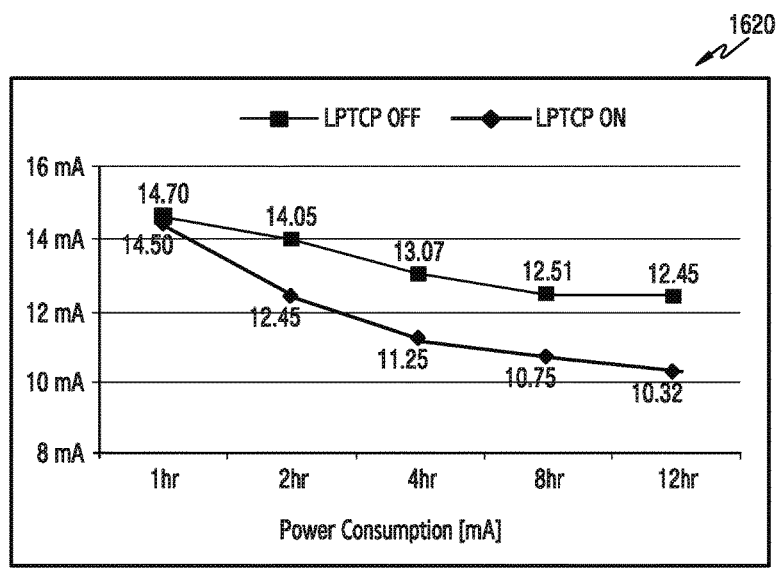

FIGS. 16A and 16B depict power saving test results of the LPTCP close according to an exemplary embodiment of the present disclosure.

Referring to FIGS. 16A and 16B, compared to the conventional TCP, the LPTCP closure saves the power about 17% in the mobile terminal such as smart phone.

Figure 17:
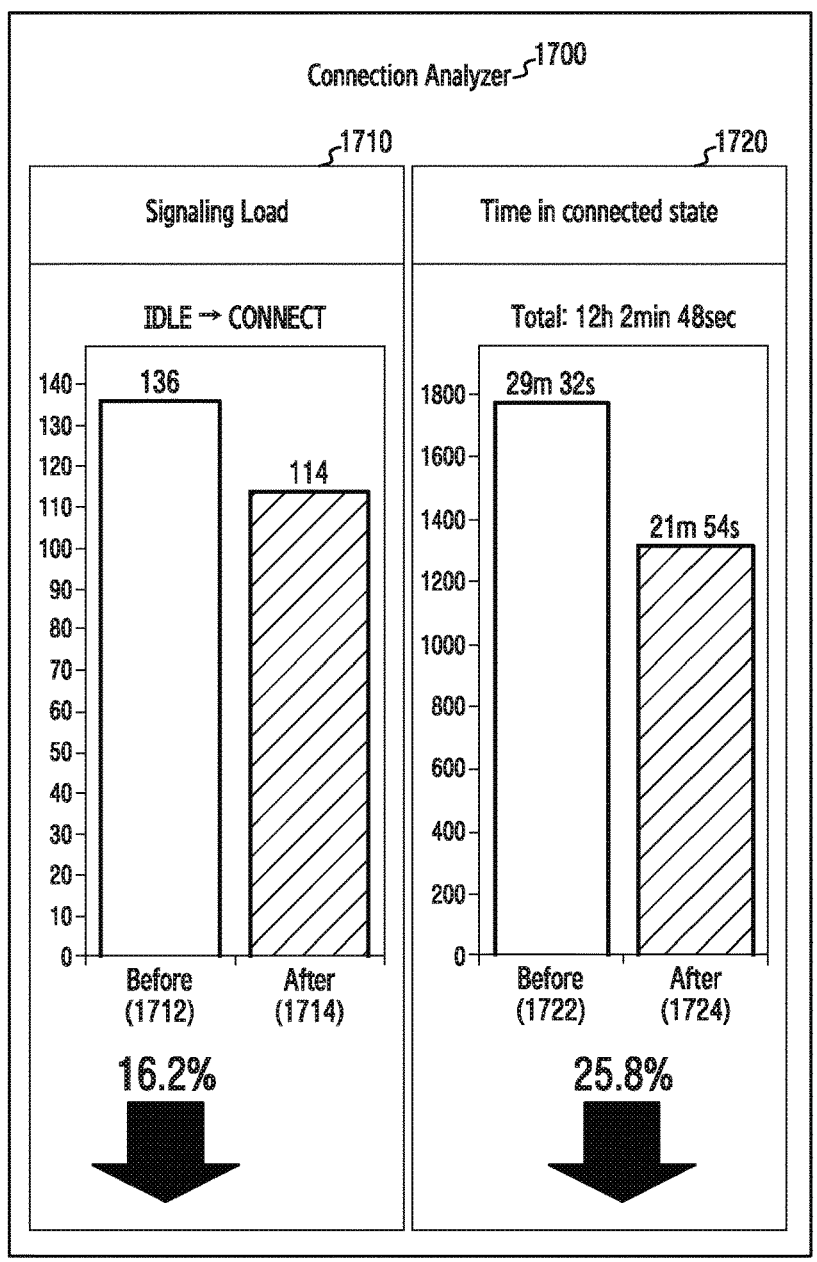
FIG. 17 illustrates network signaling reduction test results in a TCP control according to an exemplary embodiment of the present disclosure.

FIG. 17 depicts test results 1710 and 1720 of network signaling reduction in TCP control according to an exemplary embodiment of the present disclosure. The test results are obtained using a connection analyzer 1700.

Referring to FIG. 17, the LPTCP closure reduces a signaling load by 16.2% (from 136 to 114 times regarding the state transition from an idle state to a connection state) and lessens the connection time by 25.8% (from 29 min 32 sec to 21 min 54 sec).

As set forth above, the present method helps in achieving a higher battery life time after a prolonged inactive interval without degrading user experience or affecting application functionality without the need of changing application software in the client device such as smart phone.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of operating a client in a wireless communication system, comprising:
identifying a first transmission control protocol (TCP) connection and a second TCP connection that are established for the client, wherein the first TCP connection is different from the second TCP connection;
identifying an initiation of a close for the first TCP connection, wherein the first TCP connection is maintained in response to the initiation of the close for the first TCP connection;
identifying an initiation of a close for the second TCP connection during the maintenance of the first TCP connection after the initiation of the close for the first TCP connection; and
closing both the first TCP connection and the second TCP connection in response to the initiation of the close for the second TCP connection.

2. The method of claim 1, wherein the identifying of the first TCP connection comprises:
identifying the first TCP connection in response to a close message received from a server.

3. The method of claim 1, wherein a guard time period of the first TCP connection is greater than a predetermined reference time.

4. The method of claim 1, wherein a guard time period of the first TCP connection is not greater than a predetermined reference time, further comprising closing the first TCP connection at an end of the guard time period.

5. The method of claim 4, wherein the guard time period is determined based on a first time period and a second time period, and wherein:
the first time period is a period of time from a transmission time of a request to a reception time of a response to the request, and
the second time period is a period of time from the reception time of the response to a transmission time of a next request.

6. The method of claim 4, wherein the guard time period is ahead of a server-initiated first TCP connection close time.

7. The method of claim 6, wherein the server-initiated first TCP connection close is performed in response to a message indicating a close of the first TCP connection received from a server.

8. An apparatus of a client in a wireless communication system, comprising:
at least one processor configured to:
identify a first transmission control protocol (TCP) connection and a second TCP connection that are established for the client, wherein the first TCP connection is a different from the second TCP connection;

identify an initiation of a close for the first TCP connection, wherein the first TCP connection is maintained in response to the initiation of the close for the first TCP connection;

identify an initiation of a close for the second TCP connection during the maintenance of the first TCP connection after the initiation of the close for the first TCP connection; and close both the first TCP connection and the second TCP connection in response to the initiation of the close for the second TCP connection.

9. The apparatus of claim 8, wherein the at least one processor is further configured to identify the first TCP connection in response to a close message received from a server.

10. The apparatus of claim 8, wherein a guard time period of the first TCP connection is greater than a predetermined reference time.

11. The apparatus of claim 8, wherein a guard time period of the first TCP connection is not greater than a predetermined reference time, and wherein the at least one processor is further configured to close the first TCP connection at an end of the guard time period.

12. The apparatus of claim 11, wherein the guard time period is determined based on a first time period and a second time period, and wherein:

the first time period is a period of time from a transmission time of a request to a reception time of a response to the request, and the second time period is a period of time from the reception time of the response to a transmission time of a next request.

13. The apparatus of claim 11, wherein the guard time period is ahead of a server-initiated first TCP connection close time.

14. The apparatus of claim 13, wherein the server-initiated first TCP connection close is performed in response to a message indicating a close of the first TCP connection received from a server.

15. The method of claim 1, further comprising:

determining whether an end of a guard time period for the first TCP connection is later than or ahead of a reference time; and closing the first TCP connection in response to an expiration of the guard time period when the end of the guard time period is ahead of the reference time, wherein the closing of both the first TCP connection and the second TCP connection comprises closing both of the first TCP connection and the second TCP connection in response to the initiation of the close for the second TCP connection when the end of the guard time period is later than the reference time, wherein the guard time period is determined based on a first time period and a second time period, and wherein the first time period is a period of time from a transmission time of a request to a reception time of a response to the request, and the second time period is a period of time from the reception time of the response to a transmission time of a next request.

16. The apparatus of claim 8, wherein the at least one processor is further configured to:

determine whether an end of a guard time period for the first TCP connection is later than or ahead of a reference time, close the first TCP connection in response to an expiration of the guard time period when the end of the guard time period is ahead of the reference time, and close both of the first TCP connection and the second TCP connection in response to the initiation of the close for the second TCP connection when the end of the guard time period is later than the reference time, wherein the guard time period is determined based on a first time period and a second time period, and wherein the first time period is a period of time from a transmission time of a request to a reception time of a response to the request, and the second time period is a period of time from the reception time of the response to a transmission time of a next request.

* * * * *